US008706786B2

(12) United States Patent
Lee et al.

(10) Patent No.: US 8,706,786 B2
(45) Date of Patent: Apr. 22, 2014

(54) SIGNAL PROCESSING DEVICE AND IMAGE PROCESSING DEVICE

(75) Inventors: Moon Ho Lee, Jeollabuk-do (KR); Dae Chul Park, Daejeon (KR)

(73) Assignee: Industrial Cooperative Foundation Chonbuk National University, Jeollabuk-Do (KR)

( * ) Notice: Subject to any disclaimer, the term of this patent is extended or adjusted under 35 U.S.C. 154(b) by 753 days.

(21) Appl. No.: 12/953,644

(22) Filed: Nov. 24, 2010

(65) Prior Publication Data

US 2012/0078990 A1 Mar. 29, 2012

(30) Foreign Application Priority Data

Sep. 29, 2010 (KR) ........................ 10-2010-0094212

(51) Int. Cl.
*G06F 17/14* (2006.01)
(52) U.S. Cl.
USPC ........................................ 708/402; 708/400
(58) Field of Classification Search
USPC ................................................. 708/400–409
See application file for complete search history.

(56) References Cited

U.S. PATENT DOCUMENTS

| 5,408,425 | A | * | 4/1995 | Hou .............................. 708/402 |
| 5,410,500 | A | * | 4/1995 | Ohki .............................. 708/603 |
| 5,748,903 | A | * | 5/1998 | Agarwal ...................... 709/247 |
| 5,790,441 | A | * | 8/1998 | Oami et al. .................... 708/400 |
| 5,812,788 | A | * | 9/1998 | Agarwal ...................... 709/247 |
| 6,006,246 | A | * | 12/1999 | Ohki .............................. 708/607 |
| 6,011,499 | A | * | 1/2000 | Agarwal et al. ................. 341/67 |
| 6,788,811 | B1 | * | 9/2004 | Matsuura et al. ............. 382/166 |
| 2003/0236809 | A1 | * | 12/2003 | Hou .............................. 708/400 |
| 2004/0202376 | A1 | * | 10/2004 | Schwartz et al. ............. 382/244 |
| 2005/0058348 | A1 | * | 3/2005 | Nagai ............................ 382/199 |
| 2011/0211636 | A1 | * | 9/2011 | Yamada et al. ........... 375/240.12 |
| 2013/0101048 | A1 | * | 4/2013 | Lee et al. .................. 375/240.19 |

OTHER PUBLICATIONS

Hsiao et al., "A cost-efficient and fully-pipelinable architecture for DCT/IDCT", IEEE Trans. Consumer Electron., vol. 45, pp. 515-525, 1999.*
Lee et al., Korean Patent Publication 10-2009-0027811, machine translation, published Mar. 8, 2009.*
Chen et al., "Fast Hybrid DFT/DCT Architecture for OFDM in Cognitive Radio System," Future Generation Communication and Networking (FGCN 2007) , vol. 1, pp. 301-306, Dec. 2007.*
Lu et al., "On the Design of Selective Coefficient DCT Module", IEEE Trans. Circuits Syst. Video Technology, vol. 8, No. 2, pp. 143-146, 1998.*
Jia Hou, Moon-ho Lee, and Dae Chul Park, "DCT/Haar/Slant Sparse Matrix Generation via Jacket Matrix," TENCON 2006, pp. 1-4, Nov. 14-17, 2006.*
Jia Hou, Moon Ho Lee, Dae Chul Park, and Kwang Jae Lee, "Simple Element Inverse DCT/DFT Hybrid Architecture Algorithm," IEEE International Conference on Acoustics, Speech and Signal Processing, vol. 3, pp. 888-891, 2006.*

* cited by examiner

*Primary Examiner* — Chuong D Ngo
*Assistant Examiner* — Matthew Sandifer
(74) *Attorney, Agent, or Firm* — Ohlandt, Greeley, Ruggiero & Perle, LLP

(57) ABSTRACT

A signal processing device and an image processing device are provided. The signal processing device includes a matrix calculator for performing a matrix operation selected by a switch part among a DCT matrix operation, a Haar matrix operation, and a Slant matrix operation, with respect to an input signal. Thus, the signal processing device can be implemented in a hybrid architecture capable of selectively processing the DCT-II transform, the Haar transform, and the Slant transform with a single chip.

8 Claims, 4 Drawing Sheets

SIGNAL PROCESSING DEVICE AND IMAGE PROCESSING DEVICE

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Sep. 29, 2010, and assigned Serial No. 10-2010-0094212, the entire disclosure of which is hereby incorporated by reference.

TECHNICAL FIELD OF THE INVENTION

The present invention relates generally to a signal processing device and an image processing device. More particularly, the present invention relates to a signal processing device and an image processing device for Discrete Cosine Transformation (DCT)-II, Haar, and Slant transforms.

BACKGROUND OF THE INVENTION

Discrete Cosine Transformation (DCT)-II, Haar, and Slant transform techniques are applied variously in signal processing. In particular, these signal transform techniques are used for image encoding processing or signal modulation.

The DCT, specifically, the DCT-II is used to process signals and images. The DCT is widely used for lossy compression because it has an energy compaction property in which most of signal energy components tend to be concentrated in a few low-frequency components. For example, JPEG image compression, MJPEG, MPEG, and DV video compression adopt the DCT. Two-dimensional DCT-II is applied to N×N blocks and its results are quantized and entropy-coded.

The Haar transform and the Slant transform are also useful in various signal processing fields.

Circuits for the DCT-II, the Haar transform, and the Slant transform are implemented as separate circuits or separate chips. However, when the transform circuits are separately provided, a device including the circuits increases in volume and its processing rate is retarded.

In this respect, what is needed is a method for realizing a unified circuit for the DCT-II, the Haar transform, and the Slant transform.

SUMMARY OF THE INVENTION

To address the above-discussed deficiencies of the prior art, it is a primary aspect of the present invention to provide a signal processing device including a matrix calculator which performs a matrix operation selected by a switch part from a DCT matrix operation, a Haar matrix operation, and a Slant matrix operation, with respect to an input signal, and an image processing device using the same.

According to one aspect of the present invention, a signal processing device includes a switch part for selecting any one of a Discrete Cosine Transformation (DCT) matrix operation, a Haar matrix operation, and a Slant matrix operation; and a matrix calculator for performing a matrix operation selected by the switch part among the DCT matrix operation, the Haar matrix operation, and the Slant matrix operation, with respect to an input signal.

The matrix calculator may include one butterfly structure shared and used in the DCT-II matrix operation, the Haar matrix operation, and the Slant matrix operation.

The matrix calculator may include a row permutation matrix calculator for processing a row permutation matrix operation for the input signal and sending the operated signal to the switch part; a DCT-II matrix calculator for processing the DCT-II matrix operation for the signal output from the switch part; a Haar matrix calculator for processing the Haar matrix operation for the signal output from the switch part; Slant matrix calculator for processing the Slant matrix operation for the signal output from the switch part; a butterfly structure calculator for processing a butterfly structure operation for a signal output from one of the DCT-II matrix calculator, the Haar matrix calculator, and the Slant matrix calculator; and a column permutation matrix calculator for processing a column permutation matrix operation for a signal output from the butterfly structure calculator.

The switch part may output the signal input from the row permutation matrix calculator to any one of the DCT-II matrix calculator, the Haar matrix calculator, and the Slant matrix calculator.

The DCT-II matrix calculator may perform the matrix operation for a matrix $[C]_N$ in the following equation:

$$[Pr]_N [C]_N [Pc]_N = \begin{bmatrix} C_{N/2} & C_{N/2} \\ B_{N/2} & -B_{N/2} \end{bmatrix}$$

$$= \left( \begin{bmatrix} I_{N/2} & I_{N/2} \\ I_{N/2} & -I_{N/2} \end{bmatrix} \begin{bmatrix} C_{N/2} & 0 \\ 0 & B_{N/2} \end{bmatrix} \right)^T$$

where $[C]_{N/2}$ denotes a $$\frac{N}{2} \times \frac{N}{2}$$

DCT-II matrix, $[B]_{N/2} = \lfloor (C_{2N}^{f(m,n)})_{m,n} \rfloor_{N/2}$, and $$\begin{cases} f(m, 1) = 2m - 1, \\ f(m, n+1) = f(m, n) + f(m, 1) \times 2, \, m, n \in \{1, 2, \ldots, N/2\}. \end{cases}$$

The Haar matrix calculator may perform the matrix operation for a matrix HT (N) in the following equation:

$$[Pr]_N HT(N)[Pc]_N = Har(n)$$

$$= \begin{bmatrix} Har(N/2) & Har(N/2) \\ 2^{(\log_2(N)-1)/2} I_{N/2} & -2^{(\log_2(N)-1)/2} I_{N/2} \end{bmatrix}$$

$$= \left( \begin{bmatrix} H_{N/2} & H_{N/2} \\ H_{N/2} & -H_{N/2} \end{bmatrix} \begin{bmatrix} S_{N/2} & 0 \\ 0 & 2\left(\frac{H_{N/2}}{N/2}\right) \end{bmatrix} \right)^T$$

$$= \left( \begin{bmatrix} H_{N/2} & 0 \\ 0 & H_{N/2} \end{bmatrix} \begin{bmatrix} I_{N/2} & I_{N/2} \\ I_{N/2} & -I_{N/2} \end{bmatrix} \begin{bmatrix} S_{N/2} & 0 \\ 0 & 2\left(\frac{H_{N/2}}{N/2}\right) \end{bmatrix} \right)^T .$$

The Slant matrix calculator may perform the matrix operation for a matrix S(N) in the following equation:

$$[Pr]_N S(N)[Pc]_N = \frac{1}{\sqrt{N}} \begin{bmatrix} H_{N/2} & H_{N/2} \\ A_{N/2} & -A_{N/2} \end{bmatrix}$$

$$= \frac{1}{\sqrt{N}} \left( \begin{bmatrix} I_{N/2} & I_{N/2} \\ I_{N/2} & -I_{N/2} \end{bmatrix} \begin{bmatrix} H_{N/2} & 0_4 \\ 0_4 & A_{N/2} \end{bmatrix} \right)^T.$$

The matrix calculator may include a hybrid architecture for selectively performing the DCT-II matrix operation, the Haar matrix operation, and the Slant matrix operation.

The switch part and the matrix calculator may be implemented as a single chip.

According to another aspect of the present invention, an image processing device encodes an image signal using the signal processing device.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

Figure 1:
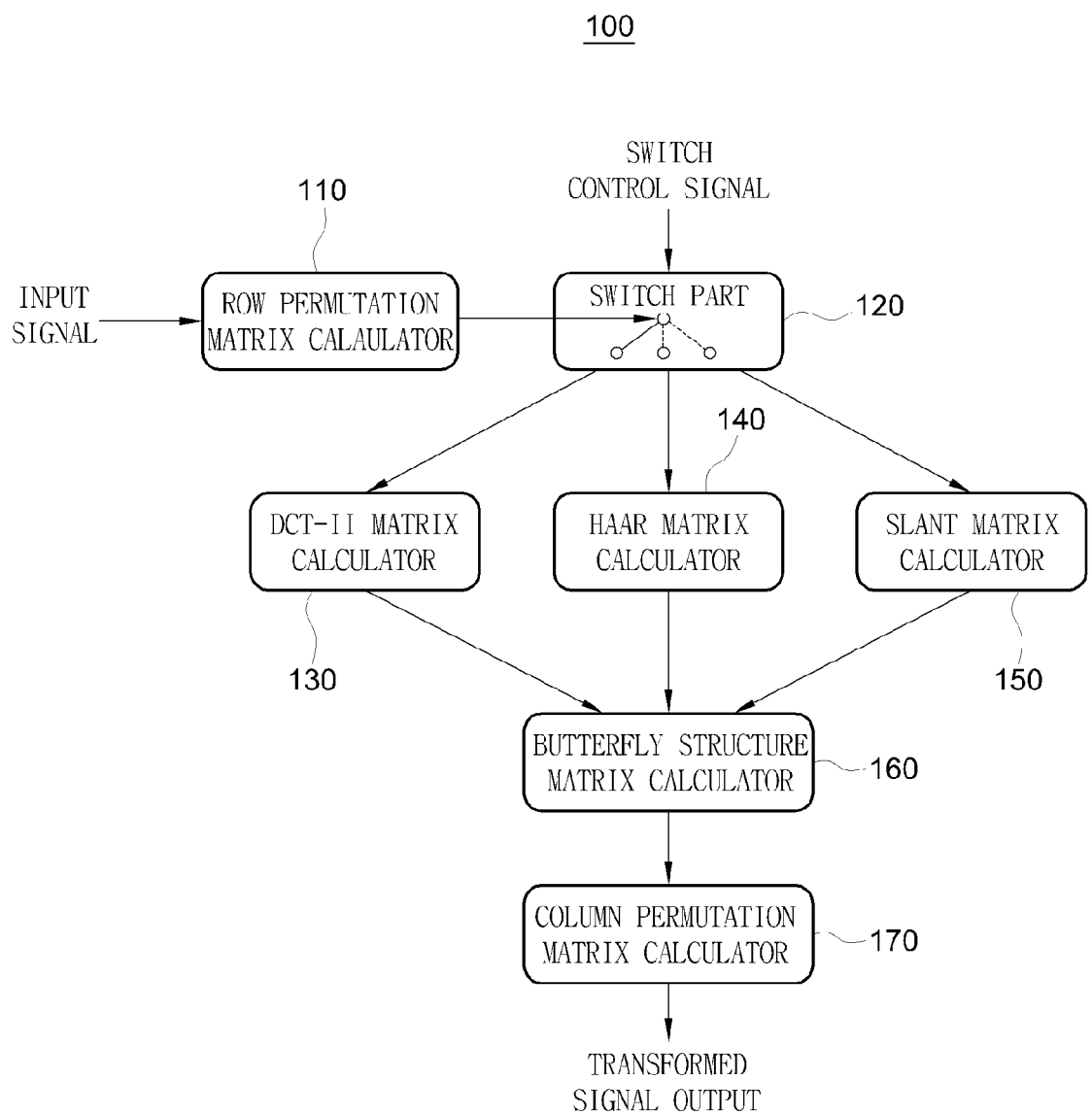
FIG. 1 is a block diagram of a hybrid signal processing device capable of processing all of DCT-II, Haar transform, and Slant transform according to an exemplary embodiment of the present invention.

Reference will now be made in detail to the embodiment of the present general inventive concept, examples of which are illustrated in the accompanying drawings, wherein like reference numerals refer to the like elements throughout. The embodiment is described below in order to explain the present general inventive concept by referring to the drawings.

Exemplary embodiments of the present invention provide equations for a new representation of Discrete Cosine Transformation (DCT)-II, Haar transform, and Slant transform matrices decomposed based on block-inverse processing. Based on the equations, the DCT-II, the Haar transform, and the Slant transform matrices have similar recursive computational pattern, and are decomposed to one orthogonal character matrix and a special sparse matrix. The special sparse matrix belongs includes Jacket matrices. The DCT-II, Haar, and Slant transform matrices are decomposed to reveal their common part, and the common part can be implemented using a butterfly structure. Thus, a hybrid signal processing device capable of selectively processing the DCT-II, the Haar transform, and the Slant transform in a single circuit structure can be implemented. The matrix decomposition for the hybrid signal processing device is now illustrated based on equations.

1. Concept and Properties of Jacket Matrix

Normal matrices (for example, real symmetric, Hermitian, and unitary matrix) can be diagonalized by unitary transform. In a general case, any matrix with linearly independent columns can be factorized into AE=QR. Such factorization can be applied to orthogonal matrices such as DCT/Haar/Slant transform via a Jacket matrix. Herein, R denotes a sparse matrix and Q denotes the unitary matrix. As a special case of QR decomposition, the matrix Q can be fixed to a trigonometric transform matrix.

The Jacket matrix includes a Hadamard matrix having weights c. c is j (j denotes an imaginary unit $j=\sqrt{-1}$) or $2^k$ (k is an integer). The Jacket matrix $[J]_N$ ($N=2^n$, $n \in \{2, 3, \ldots\}$) is symmetric.

According to a general definition, when an inverse matrix of a square matrix $[J]_N = [a_{ij}]_N$ is an element-wise inverse (that is, $$[J]_N^{-1} = \frac{1}{N}[1/a_{ji}], 1 < i, j < N),$$

the matrix $[J]_N$ is a Jacket matrix.

Orthogonal matrices such as Hadamard, DFT, DCT, Haar, and Slant matrices belong to the Jacket matrices family. N×N Jacket matrices can be obtained using a recursive equation.

$$[J]_N = [J]_{N/2} \otimes [H]_2, N=2^n, n \in \{2,3,\ldots\} \quad (1)$$

⊗ denotes the Kronecker product.

2. Decomposition of DCT/Haar/Slant Matrix

A. Recursive Factorization of DCT Matrix Via Jacket Matrix

Each element in the DCT-II matrix $[C_N]$ is defined as Equation 2.

$$[C_N]_{m,n} = \sqrt{\frac{2}{N}} k_m \cos \frac{m\left(n+\frac{1}{2}\right)\pi}{N}, m, n = 0, 1, \ldots, N-1 \quad (2)$$

$$\text{where } k_j = \begin{cases} 1, & j = 1, 2, \ldots, N-1 \\ \frac{1}{\sqrt{2}}, & j = 0, N \end{cases}$$

Based on Equation 2, a 2×2 DCT-II matrix can be simply written as Equation 3.

$$[C]_2 = \begin{bmatrix} \frac{1}{\sqrt{2}} & \frac{1}{\sqrt{2}} \\ C_4^1 & C_4^3 \end{bmatrix} = \begin{bmatrix} \frac{1}{\sqrt{2}} & \frac{1}{\sqrt{2}} \\ \frac{1}{\sqrt{2}} & -\frac{1}{\sqrt{2}} \end{bmatrix} = \begin{bmatrix} 1 & 1 \\ 1 & -1 \end{bmatrix} \frac{1}{\sqrt{2}} \quad (3)$$

$$\frac{1}{\sqrt{2}}$$

is a special element inverse matrix of order 1 and its inverse is $\sqrt{2}$. $C_j^i = \cos(i\pi/l)$ denotes a cosine unit for DCT computations.

A 4×4 DCT-II matrix is given by Equation 4.

$$[C]_4 = \begin{bmatrix} \frac{1}{\sqrt{2}} & \frac{1}{\sqrt{2}} & \frac{1}{\sqrt{2}} & \frac{1}{\sqrt{2}} \\ C_8^1 & C_8^3 & C_8^5 & C_8^7 \\ C_8^2 & C_8^6 & C_8^6 & C_8^2 \\ C_8^3 & C_8^7 & C_8^1 & C_8^5 \end{bmatrix} \quad (4)$$

By exploiting a row permutation matrix $[Pr]_4$, Equation 5 is produced.

$$[Pr]_4[C]_4 = \begin{bmatrix} 1 & 0 & 0 & 0 \\ 0 & 0 & 1 & 0 \\ 0 & 1 & 0 & 0 \\ 0 & 0 & 0 & 1 \end{bmatrix} \begin{bmatrix} \frac{1}{\sqrt{2}} & \frac{1}{\sqrt{2}} & \frac{1}{\sqrt{2}} & \frac{1}{\sqrt{2}} \\ C_8^1 & C_8^3 & C_8^5 & C_8^7 \\ C_8^2 & C_8^6 & C_8^6 & C_8^2 \\ C_8^3 & C_8^7 & C_8^1 & C_8^5 \end{bmatrix} \quad (5)$$

$$= \begin{bmatrix} \frac{1}{\sqrt{2}} & \frac{1}{\sqrt{2}} & \frac{1}{\sqrt{2}} & \frac{1}{\sqrt{2}} \\ C_8^2 & C_8^6 & C_8^6 & C_8^2 \\ C_8^1 & C_8^3 & C_8^5 & C_8^7 \\ C_8^3 & C_8^7 & C_8^1 & C_8^5 \end{bmatrix}$$

The row permutation matrix is given by Equation 6.

$$[Pr]_2 = [I]_2, \quad (6)$$

$$[Pr]_N = [pr_{ij}]_N, \, N \geq 4,$$

$$\begin{cases} pr_{i,j} = 1, & \text{if } i = 2j, \, 0 \leq j \leq \frac{N}{2} - 1, \\ pr_{i,j} = 1, & \text{if } i = (2j+1) \bmod N, \, \frac{N}{2} \leq j \leq N - 1, \\ pr_{i,j} = 0, & \text{others} \end{cases}$$

Since $C_8^1 = -C_8^7$, $C_8^2 = -C_8^6$, $C_8^3 = -C_8^5$ according to the Cosine properties, Equation 5 can be rewritten as Equation 7.

$$[Pr]_4[C]_4 = \begin{bmatrix} \frac{1}{\sqrt{2}} & \frac{1}{\sqrt{2}} & \frac{1}{\sqrt{2}} & \frac{1}{\sqrt{2}} \\ C_8^2 & C_8^6 & C_8^6 & C_8^2 \\ C_8^1 & C_8^3 & C_8^5 & C_8^7 \\ C_8^3 & C_8^7 & C_8^1 & C_8^5 \end{bmatrix} \quad (7)$$

$$= \begin{bmatrix} \frac{1}{\sqrt{2}} & \frac{1}{\sqrt{2}} & \frac{1}{\sqrt{2}} & \frac{1}{\sqrt{2}} \\ C_8^2 & -C_8^6 & -C_8^6 & C_8^2 \\ C_8^1 & C_8^3 & -C_8^5 & -C_8^7 \\ C_8^3 & -C_8^7 & C_8^1 & -C_8^5 \end{bmatrix}$$

A 4×4 column permutation matrix is defined as $$[Pc]_4 = \begin{bmatrix} 1 & 0 & 0 & 0 \\ 0 & 1 & 0 & 0 \\ 0 & 0 & 0 & 1 \\ 0 & 0 & 1 & 0 \end{bmatrix}.$$

By multiplying the column permutation matrix to Equation 7, Equation 8 is obtained.

$$[Pr]_4[C]_4[Pc]_4 = \begin{bmatrix} \frac{1}{\sqrt{2}} & \frac{1}{\sqrt{2}} & \frac{1}{\sqrt{2}} & \frac{1}{\sqrt{2}} \\ C_8^2 & C_8^6 & C_8^6 & C_8^2 \\ C_8^1 & C_8^3 & C_8^5 & C_8^7 \\ C_8^3 & C_8^7 & C_8^1 & C_8^5 \end{bmatrix} \begin{bmatrix} 1 & 0 & 0 & 0 \\ 0 & 1 & 0 & 0 \\ 0 & 0 & 0 & 1 \\ 0 & 0 & 1 & 0 \end{bmatrix} \quad (8)$$

$$== \begin{bmatrix} \frac{1}{\sqrt{2}} & \frac{1}{\sqrt{2}} & \frac{1}{\sqrt{2}} & \frac{1}{\sqrt{2}} \\ C_8^2 & -C_8^2 & C_8^2 & -C_8^2 \\ C_8^1 & C_8^3 & -C_8^1 & -C_8^3 \\ C_8^3 & -C_8^1 & -C_8^3 & C_8^1 \end{bmatrix} = \begin{bmatrix} C_2 & C_2 \\ B_2 & -B_2 \end{bmatrix}$$

corresponds to the 2×2 DCT-II matrix, and $$[C]_2 = \begin{bmatrix} \frac{1}{\sqrt{2}} & \frac{1}{\sqrt{2}} \\ \frac{1}{\sqrt{2}} & -\frac{1}{\sqrt{2}} \end{bmatrix}$$

$$[B]_2 = \begin{bmatrix} C_8^1 & C_8^3 \\ C_8^3 & -C_8^1 \end{bmatrix}.$$

Hence, Equation 8 can be rewritten as Equation 9.

$$[Pr]_4[C]_4[Pc]_4 = \begin{bmatrix} C_2 & C_2 \\ B_2 & -B_2 \end{bmatrix} \quad (9)$$

$$= \left( \begin{bmatrix} I_2 & I_2 \\ I_2 & -I_2 \end{bmatrix} \begin{bmatrix} C_2 & 0 \\ 0 & B_2 \end{bmatrix} \right)^T$$

$$\begin{bmatrix} C_2 & 0 \\ 0 & B_2 \end{bmatrix}$$

is a block inverse matrix, of which the inverse is given by Equation 10.

$$\begin{bmatrix} C_2 & 0 \\ 0 & B_2 \end{bmatrix}^{-1} = \begin{bmatrix} (C_2)^{-1} & 0 \\ 0 & (B_2)^{-1} \end{bmatrix} \quad (10)$$

The Equation 10 is Jacket-like sparse matrix with block inverse.

In general, the DCT-II matrix $[C]_N$ can be constructed recursively based on Equation 11.

$$[Pr]_N [C]_N [Pc]_N = \begin{bmatrix} C_{N/2} & C_{N/2} \\ B_{N/2} & -B_{N/2} \end{bmatrix} \quad (11)$$

$$= \left( \begin{bmatrix} I_{N/2} & I_{N/2} \\ I_{N/2} & -I_{N/2} \end{bmatrix} \begin{bmatrix} C_{N/2} & 0 \\ 0 & B_{N/2} \end{bmatrix} \right)^T$$

In Equation 11, $[C]_{N/2}$ denotes a $$\frac{N}{2} \times \frac{N}{2}$$

DCT-II matrix. $[B]_{N/2}$ can be calculated based on Equation 12.

$$[B]_{N/2} = [(C_{2N}^{f(m,n)})_{m,n}]_{N/2} \quad (12)$$

$$\begin{cases} f(m, 1) = 2m - 1, \\ f(m, n+1) = f(m, n) + f(m, 1) \times 2, \, m, n \in \{1, 2, \ldots, N/2\} \end{cases} \quad (13)$$

The inverse of $[Pr]_N [C]_N [Pc]_N$ is given by Equation 14.

$$([P]_N [C]_N [Pc]_N)^{-1} = \left( \left( \begin{bmatrix} I_{N/2} & I_{N/2} \\ I_{N/2} & -I_{N/2} \end{bmatrix} \begin{bmatrix} C_{N/2} & 0 \\ 0 & B_{N/2} \end{bmatrix} \right)^T \right)^{-1} \quad (14)$$

$$= \left( \begin{bmatrix} (C_{N/2})^{-1} & 0 \\ 0 & (B_{N/2})^{-1} \end{bmatrix} \begin{bmatrix} \frac{2}{N} I_{N/2} & \frac{2}{N} I_{N/2} \\ \frac{2}{N} I_{N/2} & -\frac{2}{N} I_{N/2} \end{bmatrix} \right)^T$$

$$= \frac{2}{N} \left( \begin{bmatrix} (C_{N/2})^{-1} & 0 \\ 0 & (B_{N/2})^{-1} \end{bmatrix} \begin{bmatrix} I_{N/2} & I_{N/2} \\ I_{N/2} & -I_{N/2} \end{bmatrix} \right)^T$$

In Equation 14, the top left block matrix $[C]_{N/2}$ of $[C]_N$ has the recursive factorization. By contrast, the bottom right $[B]_{N/2}$ is not recursively factorized.

The present algorithm explains the recursive form and relations using Equation 12 and trigonometric identities. According to Equation 12, an N×N matrix $[B]_N$ is defined based on the following trigonometric identities and Equation 14.

$$C_{4N}^{(2k_j+1)\Phi_m} = 2C_{4N}^{2k_j \Phi_m} C_{4N}^{\Phi_m} - C_{4N}^{(2k_j-1)\Phi_m}$$

$$= -C_{4N}^{(2k_j-1)\Phi_m} + 2C_{4N}^{2k_j \Phi_m} C_{4N}^{\Phi_m}$$

where $m \in \{0, 1, 2, \ldots\}$.

Using the trigonometric identities, $[B]_N$ is given by Equation 14.

$$[B]_N = [K]_N [C]_N [D]_N \quad (14)$$

where $$[K]_N = \begin{bmatrix} \sqrt{2} & 0 & 0 & \ldots \\ -\sqrt{2} & 2 & 0 & \ldots \\ \sqrt{2} & -2 & 2 & \ldots \\ \vdots & \vdots & & \ddots \end{bmatrix},$$

$$[D]_N = \begin{bmatrix} C_{4N}^{\Phi_0} & 0 & \ldots & 0 \\ 0 & C_{4N}^{\Phi_1} & & \vdots \\ \vdots & & \ddots & 0 \\ 0 & \ldots & 0 & C_{4N}^{\Phi_{N-1}} \end{bmatrix}.$$

The 8×8 DCT-II matrix is given by Equation 15.

$$[C]_8 = \begin{bmatrix} \frac{1}{\sqrt{2}} & \frac{1}{\sqrt{2}} & \frac{1}{\sqrt{2}} & \frac{1}{\sqrt{2}} & \frac{1}{\sqrt{2}} & \frac{1}{\sqrt{2}} & \frac{1}{\sqrt{2}} & \frac{1}{\sqrt{2}} \\ C_{16}^1 & C_{16}^3 & C_{16}^5 & C_{16}^7 & C_{16}^9 & C_{16}^{11} & C_{16}^{13} & C_{16}^{15} \\ C_{16}^2 & C_{16}^6 & C_{16}^{10} & C_{16}^{14} & C_{16}^{18} & C_{16}^{22} & C_{16}^{26} & C_{16}^{30} \\ C_{16}^3 & C_{16}^9 & C_{16}^{15} & C_{16}^{21} & C_{16}^{27} & C_{16}^{33} & C_{16}^{39} & C_{16}^{45} \\ C_{16}^4 & C_{16}^{12} & C_{16}^{20} & C_{16}^{28} & C_{16}^{36} & C_{16}^{44} & C_{16}^{52} & C_{16}^{60} \\ C_{16}^5 & C_{16}^{15} & C_{16}^{25} & C_{16}^{35} & C_{16}^{45} & C_{16}^{55} & C_{16}^{65} & C_{16}^{75} \\ C_{16}^6 & C_{16}^{18} & C_{16}^{30} & C_{16}^{42} & C_{16}^{54} & C_{16}^{66} & C_{16}^{78} & C_{16}^{90} \\ C_{16}^7 & C_{16}^{21} & C_{16}^{35} & C_{16}^{49} & C_{16}^{63} & C_{16}^{77} & C_{16}^{91} & C_{16}^{105} \end{bmatrix} \quad (15)$$

Equation 15 can be represented as Equation 16.

$$[Pr]_8 [C]_8 [Pc]_8 = \quad (16)$$

$$[\tilde{C}]_8 = \begin{bmatrix} \frac{1}{\sqrt{2}} & \frac{1}{\sqrt{2}} & \frac{1}{\sqrt{2}} & \frac{1}{\sqrt{2}} & \frac{1}{\sqrt{2}} & \frac{1}{\sqrt{2}} & \frac{1}{\sqrt{2}} & \frac{1}{\sqrt{2}} \\ C_{16}^4 & -C_{16}^4 & C_{16}^4 & -C_{16}^4 & C_{16}^4 & -C_{16}^4 & C_{16}^4 & -C_{16}^4 \\ C_{16}^2 & C_{16}^6 & -C_{16}^2 & -C_{16}^6 & C_{16}^2 & C_{16}^6 & -C_{16}^2 & -C_{16}^6 \\ C_{16}^6 & -C_{16}^2 & -C_{16}^6 & C_{16}^2 & C_{16}^6 & -C_{16}^2 & -C_{16}^6 & C_{16}^2 \\ C_{16}^1 & C_{16}^3 & -C_{16}^7 & -C_{16}^5 & -C_{16}^1 & -C_{16}^3 & C_{16}^7 & C_{16}^5 \\ C_{16}^5 & -C_{16}^1 & -C_{16}^3 & -C_{16}^7 & -C_{16}^5 & C_{16}^1 & C_{16}^3 & C_{16}^7 \\ C_{16}^3 & -C_{16}^7 & C_{16}^5 & C_{16}^1 & -C_{16}^3 & C_{16}^7 & -C_{16}^5 & -C_{16}^1 \\ C_{16}^7 & C_{16}^5 & C_{16}^1 & -C_{16}^3 & -C_{16}^7 & C_{16}^5 & -C_{16}^1 & C_{16}^3 \end{bmatrix} =$$

$$\begin{bmatrix} C_4 & C_4 \\ B_4 & -B_4 \end{bmatrix} = \left( \begin{bmatrix} I_4 & I_4 \\ I_4 & -I_4 \end{bmatrix} \begin{bmatrix} C_4 & 0 \\ 0 & B_4 \end{bmatrix} \right)^T = \begin{bmatrix} C_4 & 0 \\ 0 & K_4 C_4 D_4 \end{bmatrix}$$

-continued $$\begin{bmatrix} I_4 & I_4 \\ I_4 & -I_4 \end{bmatrix} = \begin{bmatrix} I_4 & 0 \\ 0 & K_4 \end{bmatrix} \begin{bmatrix} C_4 & 0 \\ 0 & C_4 \end{bmatrix} \begin{bmatrix} I_4 & 0 \\ 0 & D_4 \end{bmatrix} \begin{bmatrix} I_4 & I_4 \\ I_4 & -I_4 \end{bmatrix}$$

By removing all permutation matrices, Equation 16 is written as Equation 17.

$$[C]_8 = ([\tilde{P}r]_8)^{-1} \begin{bmatrix} I_4 & 0 \\ 0 & K_4 \end{bmatrix} \cdots \left[ I_4 \otimes \begin{bmatrix} I_2 & 0 \\ 0 & K_2 \end{bmatrix} \right][I_4 \otimes C_2] \quad (17)$$

$$\left[ I_4 \otimes \begin{bmatrix} I_2 & 0 \\ 0 & D_2 \end{bmatrix} \right] \left[ I_4 \otimes \begin{bmatrix} I_2 & I_2 \\ I_2 & -I_2 \end{bmatrix} \right] \cdots \begin{bmatrix} I_4 & 0 \\ 0 & D_4 \end{bmatrix} \begin{bmatrix} I_4 & I_4 \\ I_4 & -I_4 \end{bmatrix}([\tilde{P}c]_8)^{-1}$$

The DCT-II matrix is represented as stated above.

B. Recursive Factorization of Haar Matrix Via Jacket Matrix

The Haar matrix HT(N) is obtained using a set of Haar functions {har(r,m,t)} defined by Equation 18.

$$har(0, 0, t) = 1, t \in [1, 0) \quad (18)$$

$$har(r, m, t) = \begin{cases} 2^{r/2}, & \frac{m-1}{2^r} \le t < \frac{m-1/2}{2^r} \\ -2^{r/2}, & \frac{m-1}{2^r} \le t < \frac{m}{2^r} \\ 0, & \text{elsewhere for } t \in [0, 1) \end{cases}$$

For example, a 2×2 Haar matrix can be given by $$HT(2) = \begin{bmatrix} 1 & 1 \\ \sqrt{2} & -\sqrt{2} \end{bmatrix} = \left( \begin{bmatrix} 1 & 1 \\ 1 & -1 \end{bmatrix} \begin{bmatrix} 1 & 0 \\ 0 & \sqrt{2} \end{bmatrix} \right)^T$$

$$= ([H]_2[S]_2)^T$$

where $[S]_2 = \begin{bmatrix} 1 & 0 \\ 0 & \sqrt{2} \end{bmatrix}$.

It is Jacket-like sparse matrix.

A 8×8 Haar matrix is given by Equation 19.

$$HT(8) = \begin{bmatrix} 1 & 1 & 1 & 1 & 1 & 1 & 1 & 1 \\ 1 & 1 & 1 & 1 & -1 & -1 & -1 & -1 \\ \sqrt{2} & \sqrt{2} & -\sqrt{2} & -\sqrt{2} & 0 & 0 & 0 & 0 \\ 0 & 0 & 0 & 0 & \sqrt{2} & \sqrt{2} & -\sqrt{2} & -\sqrt{2} \\ -2 & -2 & 0 & 0 & 0 & 0 & 0 & 0 \\ 0 & 0 & 2 & -2 & 0 & 0 & 0 & 0 \\ 0 & 0 & 0 & 0 & 2 & -2 & 0 & 0 \\ 0 & 0 & 0 & 0 & 0 & 0 & 2 & -2 \end{bmatrix} \quad (19)$$

HT(8) is rearranged to the matrix Har(N) multiplying row and column permutation matrices based on Equation 20.

$$[Pr]_8 HT(8)[Pc]_8 =$$

$$Har(8) = \begin{bmatrix} 1 & 1 & 1 & 1 & 1 & 1 & 1 & 1 \\ 1 & -1 & 1 & -1 & 1 & -1 & 1 & -1 \\ \sqrt{2} & 0 & -\sqrt{2} & 0 & \sqrt{2} & 0 & -\sqrt{2} & 0 \\ 0 & \sqrt{2} & 0 & -\sqrt{2} & 0 & \sqrt{2} & 0 & -\sqrt{2} \\ 2 & 0 & 0 & 0 & -2 & 0 & 0 & 0 \\ 0 & 2 & 0 & 0 & 0 & -2 & 0 & 0 \\ 0 & 0 & 2 & 0 & 0 & 0 & -2 & 0 \\ 0 & 0 & 0 & 2 & 0 & 0 & 0 & -2 \end{bmatrix} = \quad (20)$$

$$\begin{bmatrix} Har(4) & Har(4) \\ 2I_4 & -2I_4 \end{bmatrix}$$

where $[Pr]_8 = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 1 & 0 & 0 & 0 \\ 0 & 0 & 0 & 0 & 0 & 0 & 0 & 1 \end{bmatrix}$ and $$[Pc]_8 = \begin{bmatrix} 1 & 0 & 0 & 0 & 0 & 0 & 0 & 0 \\ 0 & 0 & 0 & 0 & 1 & 0 & 0 & 0 \\ 0 & 0 & 1 & 0 & 0 & 0 & 0 & 0 \\ 0 & 0 & 0 & 0 & 0 & 0 & 1 & 0 \\ 0 & 1 & 0 & 0 & 0 & 0 & 0 & 0 \\ 0 & 0 & 0 & 0 & 0 & 1 & 0 & 0 \\ 0 & 0 & 0 & 1 & 0 & 0 & 0 & 0 \\ 0 & 0 & 0 & 0 & 0 & 0 & 0 & 1 \end{bmatrix}.$$

Equation 20 can be decomposed to Equation 21.

$$Har(8) = \begin{bmatrix} Har(4) & Har(4) \\ 2I_4 & -2I_4 \end{bmatrix} \quad (21)$$

$$= \left( \begin{bmatrix} H_4 & H_4 \\ H_4 & -H_4 \end{bmatrix} \begin{bmatrix} S_4 & 0 \\ 0 & 2\left(\frac{H_4}{4}\right) \end{bmatrix} \right)^T$$

In Equation 21, Har(4)=$H_4 S_4$, $H_4$ denotes the Hadamard matrix, and $[S]_4$ is given by Equation 22.

$$[S]_4 = \begin{bmatrix} 1 & 0 & 0 & 0 \\ 0 & \sqrt{2} & 0 & 0 \\ 0 & 0 & 1 & 1 \\ 0 & 0 & 1 & -1 \end{bmatrix} = \begin{bmatrix} S_2 & 0 \\ 0 & H_2 \end{bmatrix} \quad (22)$$

where $[S]_2 = \begin{bmatrix} 1 & 0 \\ 0 & \sqrt{2} \end{bmatrix}$.

The inverse of Equation 21 is the block inverse as expressed in Equation 23.

$$([S]_4)^{-1} = \begin{bmatrix} 1 & 0 & 0 & 0 \\ 0 & 1/\sqrt{2} & 0 & 0 \\ 0 & 0 & 1/2 & 1/2 \\ 0 & 0 & 1/2 & -1/2 \end{bmatrix} = \begin{bmatrix} (S_2)^{-1} & 0 \\ 0 & (H_2)^{-1} \end{bmatrix} \quad (23)$$

In general, HT(N) is obtained based on Equation 24.

$$[Pr]_N HT(N)[Pc]_N = Har(N) = \begin{bmatrix} Har(N/2) & Har(N/2) \\ 2^{(\log_2(N)-1)/2} & -2^{(\log_2(N)-1)/2}I_{N/2} \end{bmatrix} = \quad (24)$$

$$\left( \begin{bmatrix} H_{N/2} & H_{N/2} \\ H_{N/2} & -H_{N/2} \end{bmatrix} \begin{bmatrix} S_{N/2} & 0 \\ 0 & 2\left(\frac{H_{N/2}}{N/2}\right) \end{bmatrix} \right)^T =$$

$$\left( \begin{bmatrix} H_{N/2} & 0 \\ 0 & H_{N/2} \end{bmatrix} \begin{bmatrix} I_{N/2} & I_{N/2} \\ I_{N/2} & -I_{N/2} \end{bmatrix} \begin{bmatrix} S_{N/2} & 0 \\ 0 & 2\left(\frac{H_{N/2}}{N/2}\right) \end{bmatrix} \right)^T$$

The inverse of HT(N) is given by Equation 25.

$$Har(N)^{-1} = \left( \begin{bmatrix} H_{N/2} & H_{N/2} \\ H_{N/2} & -H_{N/2} \end{bmatrix} \begin{bmatrix} S_{N/2} & 0 \\ 0 & 2\left(\frac{H_{N/2}}{N/2}\right) \end{bmatrix} \right)^T \quad (25)$$

$$= \left( \frac{1}{N} \begin{bmatrix} (S_{N/2})^{-1} & 0 \\ 0 & \left(2\left(\frac{H_{N/2}}{N/2}\right)\right)^{-1} \end{bmatrix} \begin{bmatrix} H_{N/2} & H_{N/2} \\ H_{N/2} & -H_{N/2} \end{bmatrix} \right)^T$$

As above, the Haar matrix can be decomposed to the recursive factorization.

C. Recursive Factorization of Haar Matrix Via Jacket Matrix

When S(N) denotes the N×N slant matrix, the lowest-order slant matrix is given by Equation 26.

$$S(2) = \frac{1}{\sqrt{2}} \begin{bmatrix} 1 & 1 \\ 1 & -1 \end{bmatrix} \quad (26)$$

The slant matrix for N=4 is given by Equation 27.

$$S(4) = \frac{1}{\sqrt{4}} \begin{bmatrix} 1 & 1 & 1 & 1 \\ a+b & a-b & -a+b & -a-b \\ 1 & -1 & -1 & 1 \\ a-b & -a-b & a+b & -a+b \end{bmatrix} \quad \text{where} \quad (27)$$

$$a = \frac{2}{\sqrt{5}}, \quad b = \frac{1}{\sqrt{5}}.$$

By multiplying Equation 27 by a row permutation matrix $[P_r]_4$ and a column permutation matrix $[P_c]_4$, Equation 28 is yielded.

$$[Pr]_4 S(4)[Pc]_4 = \frac{1}{\sqrt{4}} \begin{bmatrix} 1 & 0 & 0 & 0 \\ 0 & 0 & 1 & 0 \\ 0 & 1 & 0 & 0 \\ 0 & 0 & 0 & 1 \end{bmatrix} \begin{bmatrix} 1 & 1 & 1 & 1 \\ a+b & a-b & -a+b & -a-b \\ 1 & -1 & -1 & 1 \\ a-b & -a-b & a+b & -a+b \end{bmatrix} \quad (28)$$

$$\begin{bmatrix} 1 & 0 & 0 & 0 \\ 0 & 1 & 0 & 0 \\ 0 & 0 & 0 & 1 \\ 0 & 0 & 1 & 0 \end{bmatrix} = \frac{1}{\sqrt{4}} \begin{bmatrix} 1 & 1 & 1 & 1 \\ 1 & -1 & 1 & -1 \\ a+b & a-b & -(a+b) & -(a-b) \\ a-b & -(a+b) & -(a-b) & a+b \end{bmatrix} =$$

-continued $$\frac{1}{\sqrt{4}} \begin{bmatrix} H_2 & H_2 \\ A_2 & -A_2 \end{bmatrix} \text{ where}$$

$$[A]_2 = \begin{bmatrix} a+b & a-b \\ a-b & -(a+b) \end{bmatrix} = \frac{1}{\sqrt{5}} \begin{bmatrix} 3 & 1 \\ 1 & -3 \end{bmatrix} = \frac{1}{\sqrt{5}} \begin{bmatrix} a_1 & 1 \\ 1 & -a_1 \end{bmatrix}.$$

Hence, Equation 27 can be rewritten as Equation 29.

$$[Pr]_4 S(4)[Pc]_4 = \frac{1}{\sqrt{4}} \begin{bmatrix} H_2 & H_2 \\ A_2 & -A_2 \end{bmatrix} \quad (29)$$

$$= \frac{1}{\sqrt{4}} \left( \begin{bmatrix} H_2 & 0_2 \\ 0_2 & A_2 \end{bmatrix} \begin{bmatrix} I_2 & I_2 \\ I_2 & -I_2 \end{bmatrix} \right)$$

Herein, the inverse of the sparse matrix $$\begin{bmatrix} H_2 & 0 \\ 0 & A_2 \end{bmatrix}$$

is the block inverse. Thus, the inverse of Equation 29 is given by Equation 30.

$$([P_r]_4 S(4)[P_c]_4)^{-1} = \left( \begin{bmatrix} (H_2)^{-1} & 0 \\ 0 & (A_2)^{-1} \end{bmatrix} \begin{bmatrix} I_2 & I_2 \\ I_2 & -I_2 \end{bmatrix} \right)^T \quad (30)$$

Similarly, the higher-order Slant matrix can be derived from the lower-order Slant matrix and the sparse matrix. An N-order Slant matrix can be obtained based on $$S(N) = \frac{1}{\sqrt{2}} \begin{bmatrix} 1 & 0 & 0 & 0 & 1 & 0 & 0 & 0 \\ a_N & b_N & 0 & 0 & -a_N & b_N & 0 & 0 \\ 0 & 0 & I_{\frac{(N-4)}{4}} & 0 & 0 & 0 & I_{\frac{(N-4)}{4}} & 0 \\ 0 & 0 & 0 & I_{\frac{(N-4)}{4}} & 0 & 0 & 0 & I_{\frac{(N-4)}{4}} \\ 0 & 1 & 0 & 0 & 0 & -1 & 0 & 0 \\ -b_N & a_N & 0 & 0 & b_N & a_N & 0 & 0 \\ 0 & 0 & I_{\frac{(N-4)}{4}} & 0 & 0 & 0 & -I_{\frac{(N-4)}{4}} & 0 \\ 0 & 0 & 0 & I_{\frac{(N-4)}{4}} & 0 & 0 & 0 & -I_{\frac{(N-4)}{4}} \end{bmatrix}$$

$$(I_2 \otimes S(N/2)) \text{ where}$$

$$a_2 = 1, \quad b_N = \frac{1}{(1+4(a_{N/2})^2)^{1/2}}, \text{ and } a_N = 2b_N a_{N/2}.$$

For example, the 8×8 Slant matrix is given by Equation 31.

$$S(8) = \frac{1}{\sqrt{8}} \begin{bmatrix} 1 & 1 & 1 & 1 & 1 & 1 & 1 & 1 \\ 7/\sqrt{21} & 5/\sqrt{21} & 3/\sqrt{21} & 1/\sqrt{21} & -1/\sqrt{21} & -3/\sqrt{21} & -5/\sqrt{21} & -7/\sqrt{21} \\ 1 & -1 & -1 & 1 & 1 & -1 & -1 & 1 \\ 1/\sqrt{5} & -3/\sqrt{5} & 3/\sqrt{5} & -1/\sqrt{5} & 1/\sqrt{5} & -3/\sqrt{5} & 3/\sqrt{5} & -1/\sqrt{5} \\ 3/\sqrt{5} & 1/\sqrt{5} & -1/\sqrt{5} & -3/\sqrt{5} & -3/\sqrt{5} & -1/\sqrt{5} & 1/\sqrt{5} & 3/\sqrt{5} \\ 7/\sqrt{105} & -1/\sqrt{105} & -9/\sqrt{105} & -17/\sqrt{105} & 17/\sqrt{105} & 9/\sqrt{105} & 1/\sqrt{105} & -7/\sqrt{105} \\ 1 & -1 & -1 & 1 & -1 & 1 & 1 & -1 \\ 1/\sqrt{5} & -3/\sqrt{5} & 3/\sqrt{5} & -1/\sqrt{5} & -1/\sqrt{5} & 3/\sqrt{5} & -3/\sqrt{5} & 1/\sqrt{5} \end{bmatrix} \quad (31)$$

By multiplying the following row permutation matrix and column permutation matrix, Equation 32 is obtained.

$$[Pr]_8 = \begin{bmatrix} 1 & 0 & 0 & 0 & 0 & 0 & 0 & 0 \\ 0 & 0 & 0 & 0 & 1 & 0 & 0 & 0 \\ 0 & 0 & 1 & 0 & 0 & 0 & 0 & 0 \\ 0 & 0 & 0 & 0 & 0 & 0 & 0 & 1 \\ 0 & 1 & 0 & 0 & 0 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 1 & 0 & 0 & 0 & 0 \end{bmatrix}, \quad [Pc]_8 = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 0 & 0 & 0 & 1 \\ 0 & 0 & 0 & 0 & 0 & 0 & 1 & 0 \\ 0 & 0 & 0 & 0 & 0 & 1 & 0 & 0 \\ 0 & 0 & 0 & 0 & 1 & 0 & 0 & 0 \end{bmatrix} \quad (32)$$

$[Pr_8]S(8)[Pc]_8 = \tilde{S}(8)$ where $$\tilde{S}(8) = \frac{1}{\sqrt{8}} \begin{bmatrix} 1 & 1 & 1 & 1 & 1 & 1 & 1 & 1 \\ 3/\sqrt{5} & 1/\sqrt{5} & -1/\sqrt{5} & -3/\sqrt{5} & 3/\sqrt{5} & 1/\sqrt{5} & -1/\sqrt{5} & -3/\sqrt{5} \\ 1 & -1 & 1 & 1 & 1 & -1 & -1 & 1 \\ 1/\sqrt{5} & -3/\sqrt{5} & 3/\sqrt{5} & -1/\sqrt{5} & 1/\sqrt{5} & -3/\sqrt{5} & 3/\sqrt{5} & -1/\sqrt{5} \\ 7/\sqrt{21} & 5/\sqrt{21} & 3/\sqrt{21} & 1/\sqrt{21} & -1/\sqrt{21} & -3/\sqrt{21} & -5/\sqrt{21} & -7/\sqrt{21} \\ 7/\sqrt{105} & -1/\sqrt{105} & -9/\sqrt{105} & -17/\sqrt{105} & -7/\sqrt{105} & 1/\sqrt{105} & 9/\sqrt{105} & 17/\sqrt{105} \\ 1 & -1 & -1 & 1 & -1 & 1 & 1 & -1 \\ 1/\sqrt{5} & -3/\sqrt{5} & 3/\sqrt{5} & -1/\sqrt{5} & -1/\sqrt{5} & 3/\sqrt{5} & -3/\sqrt{5} & 1/\sqrt{5} \end{bmatrix}.$$

$[Pr]_8 S(8)[Pc]_8$ can be simplified to the following equation.

$$[Pr]_8 S(8)[Pc]_8 = \frac{1}{\sqrt{8}} \begin{bmatrix} H_4 & H_4 \\ A_4 & -A_4 \end{bmatrix} = \frac{1}{\sqrt{8}} \left( \begin{bmatrix} H_4 & 0_4 \\ 0_4 & A_4 \end{bmatrix} \begin{bmatrix} I_4 & I_4 \\ I_4 & -I_4 \end{bmatrix} \right)$$

The inverse of the sparse matrix $$\begin{bmatrix} H_4 & 0 \\ 0 & A_4 \end{bmatrix}$$

is the block inverse. $H_4$ satisfies $$H_4 = S(4) \times \sqrt{4}, \quad A_4 = \begin{bmatrix} Q_2 & 0 \\ 0 & I_2 \end{bmatrix} S(4) \times \sqrt{4} = R_4 S(4), \text{ where}$$

-continued $$Q_2 = \begin{bmatrix} q_2 & q_2 \\ -q_2 & q_1 \end{bmatrix} = \begin{bmatrix} 4\sqrt{5}/\sqrt{105} & \sqrt{5/21} \\ -\sqrt{5/21} & 4\sqrt{5}/\sqrt{105} \end{bmatrix}.$$

By removing the permutation matrices on both sides, S(8) is given by Equation 33.

$$S(8) = \frac{1}{\sqrt{8}} [P_r]_8^{-1} \begin{bmatrix} I_4 & 0 \\ 0 & R_4 \end{bmatrix} \begin{bmatrix} H_4 & 0 \\ 0 & S(4) \end{bmatrix} \begin{bmatrix} I_4 & I_4 \\ I_4 & -I_4 \end{bmatrix} [P_c]_8^{-1} \quad (33)$$

The inverse of $[Pr]_8 S(8)[Pc]_8$ is given by Equation 34.

$$([P_r]_8 S(8)[P_c]_8)^{-1} = \sqrt{8} \left( \begin{bmatrix} (H_4)^{-1} & 0 \\ 0 & (A_4)^{-1} \end{bmatrix} \begin{bmatrix} I_4 & I_4 \\ I_4 & -I_4 \end{bmatrix} \right)^T \quad (34)$$

where $$[Pr]_4 H_3 [Pc]_4 = \frac{1}{\sqrt{4}} \begin{bmatrix} H_2 & H_2 \\ A_2 & -A_2 \end{bmatrix} = \left( \frac{1}{\sqrt{4}} \left( \begin{bmatrix} H_2 & 0 \\ 0 & A_2 \end{bmatrix} \begin{bmatrix} I_2 & I_2 \\ I_2 & -I_2 \end{bmatrix} \right) \right).$$

The recursive basis in Equation 34 can be derived from S(N).

In general, Equation 35 is obtained.

$$[Pr]_N S(N)[Pc]_N = \frac{1}{\sqrt{N}} \begin{bmatrix} H_{N/2} & H_{N/2} \\ A_{N/2} & -A_{N/2} \end{bmatrix} \quad (35)$$

$$= \frac{1}{\sqrt{N}} \left( \begin{bmatrix} I_{N/2} & I_{N/2} \\ I_{N/2} & -I_{N/2} \end{bmatrix} \begin{bmatrix} H_{N/2} & 0_4 \\ 0_4 & A_{N/2} \end{bmatrix} \right)^T$$

Its inverse is given by Equation 36.

$$([Pr]_N S(N)[Pc]_N)^{-1} = \sqrt{N} \left( \begin{bmatrix} (H_{N/2})^{-1} & 0 \\ 0 & (A_{N/2})^{-1} \end{bmatrix} \begin{bmatrix} I_{N/2} & I_{N/2} \\ I_{N/2} & -I_{N/2} \end{bmatrix} \right)^T \quad (36)$$

where $H_{N/2} = S(N/2) \times \sqrt{N/2}$, $$A_{N/2} = \begin{bmatrix} Q_{N/4} & 0 \\ 0 & I_{N/4} \end{bmatrix} S(N/2) \times \sqrt{N/2}$$

As such, the Slant matrix S(N) can be decomposed to the recursive factorization.

As stated above, all of the DCT-II matrix $[C]_N$, the Haar matrix HT(N), and the slant matrix S(N) are decomposed to the multiplication of $$\begin{bmatrix} I_{N/2} & I_{N/2} \\ I_{N/2} & -I_{N/2} \end{bmatrix}$$

and the sparse matrix as expressed in Equation 11, Equation 24, and Equation 35.

When a circuit is designed using the equations of the decomposed DCT-II matrix, Haar matrix, and Slant matrix, a hybrid circuit allowing all of the DCT-II, the Haar transform, and the Slant transform can be designed.

When the DCT-II, the Haar transform, and the Slant transform are conducted based on Equation 11, Equation 24, and Equation 35, computational complexity is summarized in the following table.

| Transform | Complexity |
|---|---|
| DCT-II | Real additions: $N\log_2^N$ |
|  | Multiplication: $2N\log_2^{N/2}$ |
| HT | Real additions: $N\log_2^N + \frac{N}{2}\log_2^{N/2}$ |
|  | Multiplication: $\frac{N}{2}\log_2^{N/4}$ |
| Slant | Real additions: $N\log_2^N$ |
|  | Multiplication: $2\log_2^N$ |

3. Structure of Hybrid Signal Processing Device

Now, a hybrid signal processing device 100 is explained by referring to FIG. 1. FIG. 1 is a block diagram of the hybrid signal processing device 100 capable of processing all of the DCT-II, the Haar transform, and the Slant transform according to an exemplary embodiment of the present invention.

As shown in FIG. 1, the hybrid signal processing device 100 includes a row permutation matrix calculator 110, a switch part 120, a DCT-II matrix calculator 130, a Haar matrix calculator 140, a Slant matrix calculator 150, a butterfly structure calculator 160, and a column permutation matrix calculator 170.

The row permutation matrix calculator 110, the DCT-II matrix calculator 130, the Haar matrix calculator 140, the Slant matrix calculator 150, the butterfly structure calculator 160, and the column permutation matrix calculator 170 constitute a matrix calculator. That is, the matrix calculator conducts the matrix operation selected by the switch part 120 among the DCT matrix operation, the Haar matrix operation, and the Slant matrix operation, on the input signal. The matrix calculator includes a single butterfly structure shared and used by the DCT-II matrix operation, the Haar matrix operation, and the Slant matrix operation. Hereafter, the matrix calculator is explained in more detail by referring to FIG. 1.

The row permutation matrix calculator 110 performs the row permutation matrix operation on the input signal, and sends the operated signal to the switch part 120. That is, the row permutation matrix calculator 110 calculates the matrix $[Pr]_N$ in the above-mentioned equations.

The switch part 120 outputs the signal by selecting one of the DCT matrix operation, the Haar matrix operation, and the Slant matrix operation. In other words, the switch part 120 is connected to one of the DCT matrix calculator 130, the Haar matrix calculator 140, and the Slant matrix calculator 150.

According to a switch control signal input from outside, the switch part 120 selects the unit to connect among the DCT matrix calculator 130, the Haar matrix calculator 140, and the Slant matrix calculator 150. The switch control signal is a control signal for selecting any one of the DCT matrix operation, the Haar matrix operation, and the Slant matrix operation, and may be determined by a command input by a user.

As such, the signal processing device 100 including the switch part 120 can select and process any one of the DCT matrix operation, the Haar matrix operation, and the Slant matrix operation.

The DCT-II matrix calculator 130 conducts the DCT-II matrix operation on the signal output from the switch part 120. That is, the DCT-II matrix calculator 130 performs the matrix operation on the matrix $[C]_N$ in the following equations, which correspond to Equations 11, 12 and 13.

$$[Pr]_N [C]_N [Pc]_N = \begin{bmatrix} C_{N/2} & C_{N/2} \\ B_{N/2} & -B_{N/2} \end{bmatrix} \quad (11)$$

$$= \left( \begin{bmatrix} I_{N/2} & I_{N/2} \\ I_{N/2} & -I_{N/2} \end{bmatrix} \begin{bmatrix} C_{N/2} & 0 \\ 0 & B_{N/2} \end{bmatrix} \right)^T$$

In Equation 11, $[C]_{N/2}$ denotes the $$\frac{N}{2} \times \frac{N}{2}$$

DCT-II matrix. $[B]_{N/2}$ can be calculated based on Equation 12.

$$[B]_{N/2} = \lfloor (C_{2N}^{f(m,n)})_{m,n} \rfloor_{N/2} \quad (12)$$

$$\begin{cases} f(m, 1) = 2m - 1 \\ f(m, n+1) = f(m, n) + f(m, 1) \times, \quad m, n \in \{1, 2, \ldots, N/2\} \end{cases} \quad (13)$$

As such, the DCT-II matrix calculator 130, which includes the circuit corresponding to Equation, carries out the signal processing corresponding to the equation.

The Haar matrix calculator 140 conducts the Haar matrix operation on the signal output from the switch part 120. That is, the Haar matrix calculator 140 applies the matrix operation to the matrix HT(N) in Equation 24.

$$[Pr]_N HT(N)[Pc]_N = \quad (24)$$

$$Har(N) = \begin{bmatrix} Har(N/2) & Har(N/2) \\ 2^{(\log_2(N)-1)/2} I_{N/2} & -2^{(\log_2(N)-1)/2} I_{N/2} \end{bmatrix} =$$

$$\left( \begin{bmatrix} H_{N/2} & H_{N/2} \\ H_{N/2} & -H_{N/2} \end{bmatrix} \begin{bmatrix} S_{N/2} & 0 \\ 0 & 2\left(\frac{H_{N/2}}{N/2}\right) \end{bmatrix} \right)^T =$$

$$\left( \begin{bmatrix} H_{N/2} & 0 \\ 0 & H_{N/2} \end{bmatrix} \begin{bmatrix} I_{N/2} & I_{N/2} \\ I_{N/2} & -I_{N/2} \end{bmatrix} \begin{bmatrix} S_{N/2} & 0 \\ 0 & 2\left(\frac{H_{N/2}}{N/2}\right) \end{bmatrix} \right)^T$$

The Haar matrix calculator 140, which includes the circuit corresponding to Equation 24, carries out the signal processing corresponding to Equation 24.

The Slant matrix calculator 150 conducts the Slant matrix operation on the signal output from the switch part 120. That is, the Slant matrix calculator 150 applies the matrix operation to the matrix S(N) in Equation 35.

$$[Pr]_N S(N)[Pc]_N = \frac{1}{\sqrt{N}} \begin{bmatrix} H_{N/2} & H_{N/2} \\ A_{N/2} & -A_{N/2} \end{bmatrix} \quad (35)$$

$$= \frac{1}{\sqrt{N}} \left( \begin{bmatrix} I_{N/2} & I_{N/2} \\ I_{N/2} & -I_{N/2} \end{bmatrix} \begin{bmatrix} H_{N/2} & 0_4 \\ 0_4 & A_{N/2} \end{bmatrix} \right)^T$$

The Slant matrix calculator 150, which includes the circuit corresponding to Equation 35, carries out the signal processing corresponding to Equation 35.

The butterfly structure calculator 160 performs the butterfly structure operation on the signal output from any one of the DCT matrix calculator 130, the Haar matrix calculator 140, and the Slant matrix calculator 150. The butterfly structure calculator 160 includes the structure shared by all of the DCT matrix operation, the Haar matrix operation, and the Slant matrix operation. For example, the butterfly structure calculator 160 includes the butterfly structure to calculate $$\begin{bmatrix} I_{N/2} & I_{N/2} \\ I_{N/2} & -I_{N/2} \end{bmatrix}$$

in all of the DCT matrix operation, the Haar matrix operation, and the Slant matrix operation.

The column permutation matrix calculator 170 applies the column permutation matrix operation to the signal output from the butterfly structure calculator 170. That is, the column permutation matrix calculator 170 calculates the matrix $[Pc]_N$ in the above equations.

By means of the hybrid architecture, the signal processing device 100 performs the DCT-II matrix operation, the Haar matrix operation, and the Slant matrix operation using the common butterfly structure. Thus, the signal processing device 100 can selectively carry out the DCT-II matrix operation, the Haar matrix operation, and the Slant matrix operation with respect to the input signal.

When the signal processing device is implemented with a single chip, it is possible to implement the single circuit chip for selectively processing the DCT-II matrix operation, the Haar matrix operation, and the Slant matrix operation.

Figure 2:
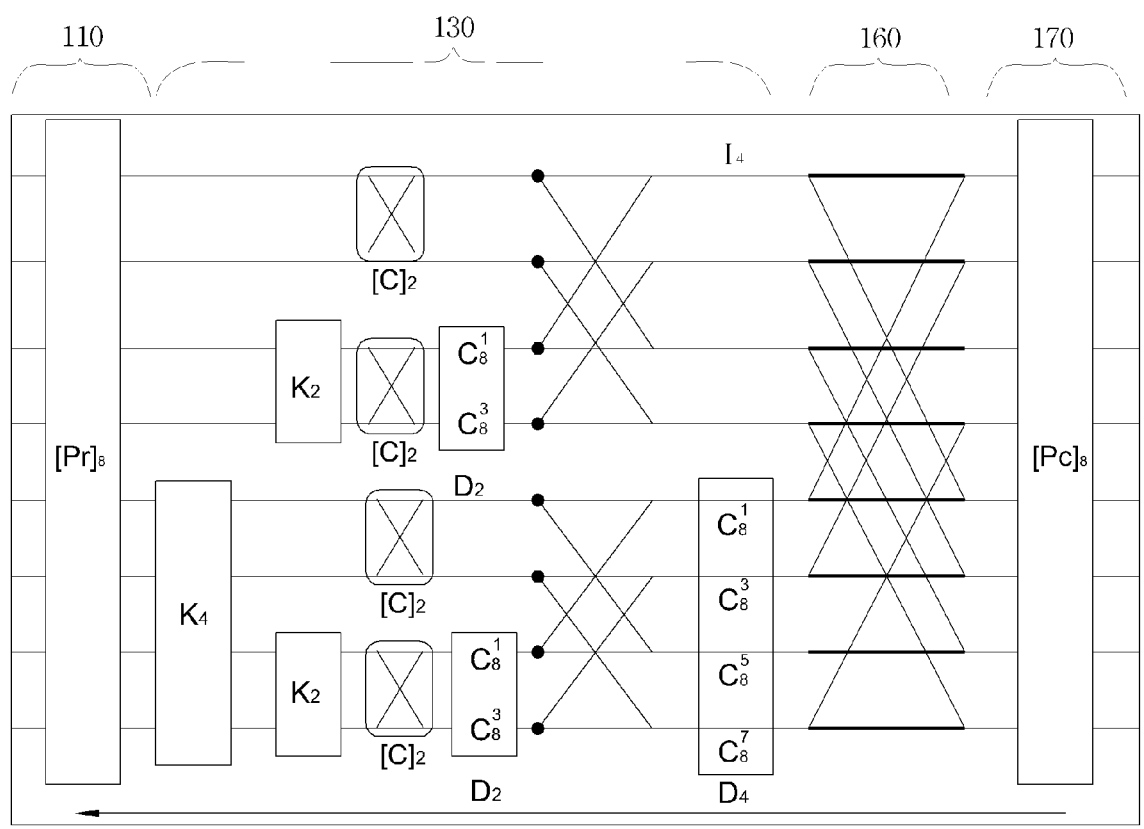
FIG. 2 is a butterfly data flow diagram of an 8×8 DCT-II matrix according to an exemplary embodiment of the present invention.
Figure 3:
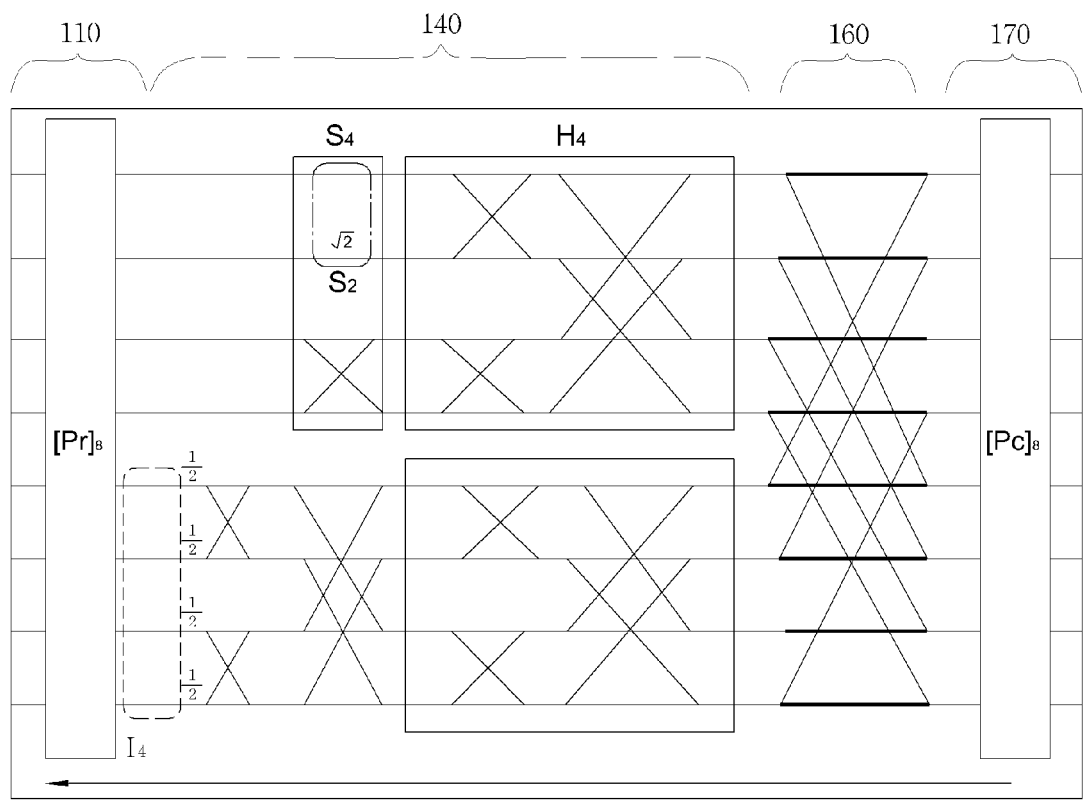
FIG. 3 is a butterfly data flow diagram of an 8×8 Haar matrix according to an exemplary embodiment of the present invention.
Figure 4:
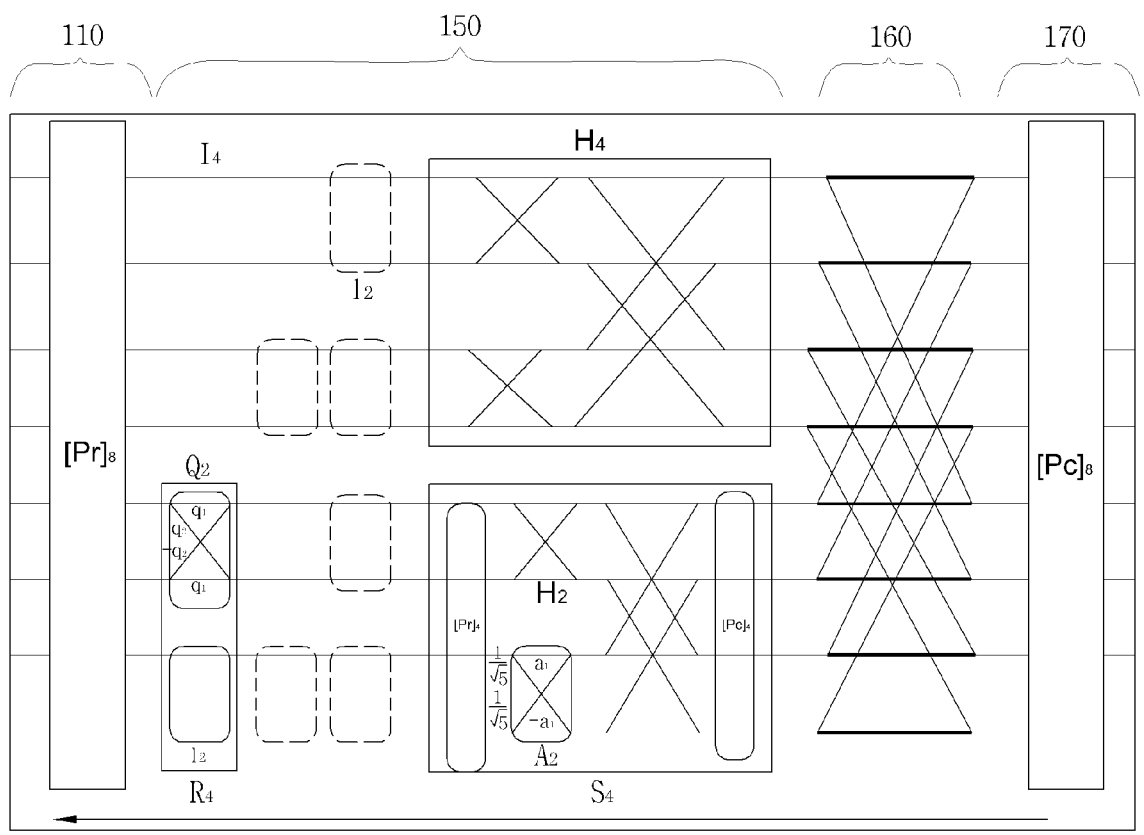
FIG. 4 is a butterfly data flow diagram of an 8×8 Slant matrix according to an exemplary embodiment of the present invention.

By referring to FIGS. 2, 3 and 4, butterfly data flow diagrams for the 8×8 DCT-II, matrix, Haar matrix, and Slant matrix are illustrated.

FIG. 2 is a butterfly data flow diagram of the 8×8 DCT-II matrix according to an exemplary embodiment of the present invention. FIG. 3 is a butterfly data flow diagram of the 8×8 Haar matrix according to an exemplary embodiment of the present invention. FIG. 4 is a butterfly data flow diagram of the 8×8 Slant matrix according to an exemplary embodiment of the present invention.

In the butterfly data flow diagrams for the three matrices in FIGS. 2, 3 and 4, the part corresponding to the row permutation matrix calculator 110, the butterfly structure calculator 160, and the column permutation matrix calculator 170 is common. Only the parts corresponding to the DCT matrix calculator 130, the Haar matrix calculator 140, and the Slant matrix calculator 150 are different from each other.

As the circuit includes only one command part and selects the different pats of the DCT matrix calculator 130, the Haar matrix calculator 140, and the Slant matrix calculator 150 using the switch part 120, the hybrid signal processing device capable of selectively calculating the DCT-II matrix, the Haar matrix, and the Slant matrix can be designed.

By selectively processing the DCT-II, the Haar transform, and the Slant transform with the signal processing device 100, an image processing device for encoding image signals can be fabricated.

Note that the signal processing device is applicable to any signal processing device adopting the DCT-II, the Haar transform, and the Slant transform besides the image processing device.

The signal processing method for the DCT-II, the Haar transform, and the Slant transform based on the above-described equations can be recorded to a computer-readable recording medium which is realized with program commands executable through various computer means. The computer-readable recording medium can contain program commands, data files, and data structures alone or in combination. Meanwhile, the program commands recorded to the recording medium can be specifically designed or constructed for exemplary embodiments of the present invention, or well-known to those skilled in computer software.

The computer-readable recording medium includes magnetic media such as hard disk, floppy disk, and magnetic tape, optical recording media such as CD and DVD, magneto-optical media such as floptical disk, and hardware devices containing and executing program commands, such as ROM, RAM, and flash memory. The recording medium can be a transmission medium, such as optical or metallic line and waveguide, including subcarriers which carry signals to define program commands and data structure.

The program commands include a machine language created by a compiler and a high-level language executable by the computer using an interpreter. The hardware device can function as one or more software module for the present invention, and vice versa.

In light of the foregoing as set forth above, the signal processing device includes the matrix calculator for processing the matrix operation selected by the switch part from the DCT matrix operation, the Haar matrix operation, and the Slant matrix operation, with respect to the input signal, and the image processing device adopts the signal processing device. Therefore, the signal processing device can be implemented in the hybrid architecture capable of selectively carrying out the DCT-II, the Haar transform, and the Slant transform with the single chip.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A signal processing device comprising:
a switch part for selecting any one of a Discrete Cosine Transformation (DCT) matrix operation, a Haar matrix operation, and a Slant matrix operation; and
a matrix calculator for performing a matrix operation selected by the switch part among the DCT matrix operation, the Haar matrix operation, and the Slant matrix operation, with respect to an input signal,
wherein the matrix calculator is implemented in a circuit and comprises:
a row permutation matrix calculator for processing a row permutation matrix operation for the input signal and sending the operated signal to the switch part;
a DCT-II matrix calculator for processing the DCT-II matrix operation for the signal output from the switch part;
a Haar matrix calculator for processing the Haar matrix operation for the signal output from the switch part;
a Slant matrix calculator for processing the Slant matrix operation for the signal output from the switch part;
a butterfly structure calculator for processing a butterfly structure operation for a signal output from the DCT-II matrix calculator, the Haar matrix calculator, and the Slant matrix calculator; and
a column permutation matrix calculator for processing a column permutation matrix operation for a signal output from the butterfly structure calculator,
wherein the switch part selectively outputs the signal input from the row permutation matrix calculator to any one of the DCT-II matrix calculator, the Haar matrix calculator, and the Slant matrix calculator.

2. The signal processing device of claim 1, wherein the butterfly structure calculator comprises one butterfly structure shared and used in the DCT-II matrix operation, the Haar matrix operation, and the Slant matrix operation.

3. The signal processing device of claim 1, wherein the DCT-II matrix calculator performs the matrix operation for a matrix $[C]_N$ in the following equation:

$$[Pr]_N[C]_N[Pc]_N = \begin{bmatrix} C_{N/2} & C_{N/2} \\ B_{N/2} & -B_{N/2} \end{bmatrix}$$

$$= \left( \begin{bmatrix} I_{N/2} & I_{N/2} \\ I_{N/2} & -I_{N/2} \end{bmatrix} \begin{bmatrix} C_{N/2} & 0 \\ 0 & B_{N/2} \end{bmatrix} \right)^T$$

where $[C]_{N/2}$ denotes a $$\frac{N}{2} \times \frac{N}{2}$$

DCT-11 matrix, $[B]_{N/2} = [(C_{2N}^{f(m,n)})_{m,n}]_{N/2}$, and $$\begin{cases} f(m, 1) = 2m - 1, \\ f(m, n+1) = f(m, n) + f(m, 1) \times 2, \quad m, n \in \{1, 2, \ldots, N/2\}. \end{cases}$$

4. The signal processing device of claim 1, wherein the Haar matrix calculator performs the matrix operation for a matrix HT(N) in the following equation:

$$[Pr]_N HT(N)[Pc]_N = Har(N) = \begin{bmatrix} Har(N/2) & Har(N/2) \\ 2^{(\log_2(N)-1)/2} I_{N/2} & -2^{(\log_2(N)-1)/2} I_{N/2} \end{bmatrix}$$

$$= \left( \begin{bmatrix} H_{N/2} & H_{N/2} \\ H_{N/2} & -H_{N/2} \end{bmatrix} \begin{bmatrix} S_{N/2} & 0 \\ 0 & 2\left(\frac{H_{N/2}}{N/2}\right) \end{bmatrix} \right)^T$$

$$= \left( \begin{bmatrix} H_{N/2} & 0 \\ 0 & H_{N/2} \end{bmatrix} \begin{bmatrix} I_{N/2} & I_{N/2} \\ I_{N/2} & -I_{N/2} \end{bmatrix} \begin{bmatrix} S_{N/2} & 0 \\ 0 & 2\left(\frac{H_{N/2}}{N/2}\right) \end{bmatrix} \right)^T.$$

5. The signal processing device of claim 1, wherein the Slant matrix calculator performs the matrix operation for a matrix S(N) in the following equation:

$$[Pr]_N S(N)[Pc]_N = \frac{1}{\sqrt{N}} \begin{bmatrix} H_{N/2} & H_{N/2} \\ A_{N/2} & -A_{N/2} \end{bmatrix}$$

$$= \frac{1}{\sqrt{N}} \left( \begin{bmatrix} I_{N/2} & I_{N/2} \\ I_{N/2} & -I_{N/2} \end{bmatrix} \begin{bmatrix} H_{N/2} & 0_4 \\ 0_4 & A_{N/2} \end{bmatrix} \right)^T.$$

6. The signal processing device of claim 1, wherein the matrix calculator comprises a hybrid architecture for selectively performing the DCT-II matrix operation, the Haar matrix operation, and the Slant matrix operation.

7. The signal processing device of claim 1, wherein the switch part and the matrix calculator are implemented as a single chip.

8. An image processing device for encoding an image signal using the signal processing device according to claim 1.

* * * * *